United States Patent
Do et al.

(10) Patent No.: US 12,225,101 B2
(45) Date of Patent: Feb. 11, 2025

(54) SIGNAL CORRECTION APPARATUS AND METHOD OF STEER-BY-WIRE SYSTEM

(71) Applicant: HYUNDAI MOBIS CO., LTD., Seoul (KR)

(72) Inventors: Young Hwan Do, Yongin-si (KR); Woo Hyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 529 days.

(21) Appl. No.: 17/535,548

(22) Filed: Nov. 24, 2021

(65) Prior Publication Data
US 2023/0011762 A1 Jan. 12, 2023

(30) Foreign Application Priority Data
Jun. 11, 2021 (KR) .......................... 10-2021-0076148

(51) Int. Cl.
*H04L 7/00* (2006.01)
*B62D 5/00* (2006.01)
(Continued)

(52) U.S. Cl.
CPC ............ *H04L 7/0041* (2013.01); *B62D 5/006* (2013.01); *B62D 5/0424* (2013.01);
(Continued)

(58) Field of Classification Search
CPC ....... H04L 7/0041; H04L 67/12; B62D 5/006; B62D 5/0424; B62D 5/0463; B62D 5/0481; B62D 15/025
(Continued)

(56) References Cited

U.S. PATENT DOCUMENTS

2002/0035424 A1* 3/2002 Kaufmann ............ B62D 5/001
180/443
2011/0248874 A1 10/2011 Cannillo et al.

FOREIGN PATENT DOCUMENTS

CN 102067456 5/2011
CN 107250838 10/2017
(Continued)

OTHER PUBLICATIONS

Korean Office Action dated Aug. 21, 2023 issued in KR 10-2021-0076148.
(Continued)

*Primary Examiner* — Intekhaab A Siddiquee
(74) *Attorney, Agent, or Firm* — DLA Piper LLP US (57) ABSTRACT

A signal correction apparatus of an SBW system may include: a command signal receiving/transmitting unit configured to receive a command signal transmitted through a vehicle communication network by an upper level apparatus, and transmit a command signal, obtained by correcting the linearity of the received command signal, to a lower level apparatus through the vehicle communication network; a buffer unit configured to store the command signal, received through the command signal transmitting/receiving unit, as an original signal; and a control unit configured to generate a command signal whose linearity is corrected, by correcting the linearity of the original signal by using the original signal stored as the command signal in the buffer unit and a command signal obtained by delaying the command signal, stored in the buffer unit, by designated one unit time.

19 Claims, 5 Drawing Sheets

(51) Int. Cl.
*B62D 5/04* (2006.01)
*B62D 15/02* (2006.01)
*H04L 67/12* (2022.01)

(52) U.S. Cl.
CPC ......... *B62D 5/0463* (2013.01); *B62D 5/0481* (2013.01); *B62D 15/025* (2013.01); *H04L 67/12* (2013.01)

(58) Field of Classification Search
USPC ....................................................... 370/503
See application file for complete search history.

(56) References Cited

FOREIGN PATENT DOCUMENTS

| CN | 107479550 A | * | 12/2017 |
| CN | 109131538 | | 1/2019 |
| JP | 5742515 | | 7/2015 |
| JP | 2016-173675 | | 9/2016 |
| JP | 2016173675 A | * | 9/2016 |
| JP | 6402428 | | 10/2018 |
| KR | 10-2011-0062119 | | 6/2011 |
| KR | 101481403 | | 1/2015 |
| KR | 10-2017-0054013 | | 5/2017 |

OTHER PUBLICATIONS

Kader, "Steer-by-Wire Control System", Swithmore College Department of Engineering, May 2006, 32 pages.
Huang et al., Fault Tolerant Sliding Mode Predictive Control for Uncertain Steer-by-Wire System, IEEE Transactions on Cybernetics, vol. 49, No. 1, Jan. 2019, 12 pages.
Chinese Office Action dated Dec. 7, 2024 issued in CN 2021116777848.

* cited by examiner

SIGNAL CORRECTION APPARATUS AND METHOD OF STEER-BY-WIRE SYSTEM

CROSS-REFERENCE TO RELATED APPLICATION

This application claims priority from and the benefit of Korean Patent Application No. 10-2021-0076148, filed on Jun. 11, 2021, which is hereby incorporated by reference for all purposes as if set forth herein.

BACKGROUND

Field

Exemplary embodiments of the present disclosure relate to a signal correction apparatus and method of an SBW (Steer-By-Wire) system, and more particularly, to a signal correction apparatus and method of an SBW system, which can correct a signal received from a transmitting unit by a receiving unit through a vehicle communication network in a vehicle to which the SBW system is applied, thereby maintaining the linearity of the signal.

Discussion of the Background

In general, an SBW system refers to a next-generation chassis control technology in which a control unit (not illustrated) controls a motor (e.g. reaction motor or steering motor) to steer a front wheel according to an input of a steering signal detected through a sensor unit (not illustrated) without a mechanical connection such as a universal joint between a steering wheel and a steering apparatus.

More specifically, the SBW system detects signals such as a steering angle and steering torque, which are the steering requirements of a driver, from a steering wheel (not illustrated) through the sensor unit (not illustrated), and transfers the detected signals to the control unit (not illustrated). Thus, the control unit generates a steering reaction force and a steering force control signal on the basis of a preset control map, drives the reaction motor (not illustrated) connected through a vehicle communication network (or desirably CAN communication) in order to provide a driver with a steering reaction force similar to an existing power steering system, and simultaneously drives a steering motor (not illustrated) through the vehicle communication network, thereby steering the vehicle in a left wheel or right wheel direction.

Thus, as a mechanical column is removed from the SBW system, the SBW system transfers a steering angle command to a steering actuator through the vehicle communication network. Therefore, road vibration which has been transferred along a mechanical connection from the road is blocked from being transferred to a driver, which makes it possible to improve steering feel.

Figure 1:
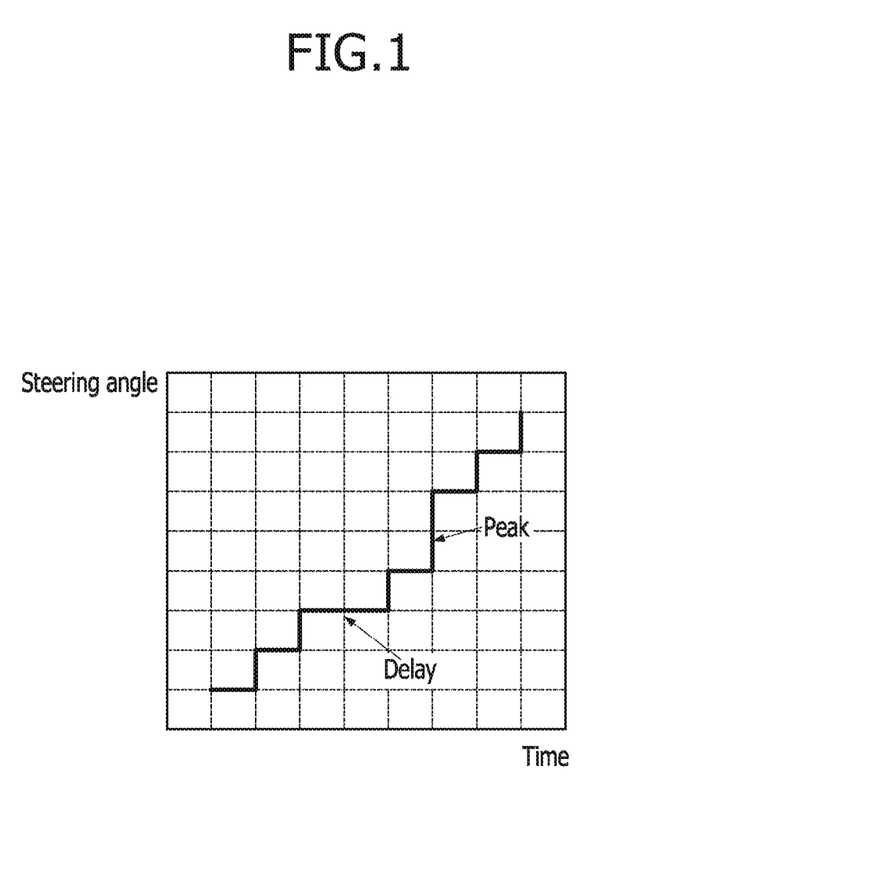
FIG. 1 is a graph for describing a situation of a conventional SBW system, in which the linearity of a signal received through a vehicle communication network is not maintained because a delay or peak occurred in the signal.

However, the SBW system may have a problem in that a signal (e.g. steering angle signal) whose linearity needs to be maintained, among the signals transferred through the vehicle communication network (e.g. CAN communication), does not maintain the linearity of the received signal, but a delay or peak may occur as illustrated in FIG. 1, due to the characteristics of the vehicle communication network.

Therefore, when the signal whose linearity needs to be maintained does not maintain the linearity but a delay or peak occurs, for example, when the steering angle signal whose linearity needs to be maintained does not maintain the linearity but a delay or peak occurs, steering is not smoothly performed but destabilized in the section of the steering angle signal, in which the delay or peak occurs.

Therefore, there is a need for a method capable of correcting the signal to a signal whose linearity is maintained, without using a filter.

The related art of the present disclosure is disclosed in Korean Patent Application Publication No. 10-2011-0062119 published on Jun. 10, 2011 and entitled "Control Apparatus and Method of SBW System".

SUMMARY

Various embodiments are directed to a signal correction apparatus and method of an SBW system, which can correct a signal received from a transmitting unit by a receiving unit through a vehicle communication network in a vehicle to which the SBW system is applied, thereby maintaining the linearity of the signal.

In an embodiment, a signal correction apparatus of an SBW system may include: a command signal receiving/transmitting unit configured to receive a command signal transmitted through a vehicle communication network by an upper level apparatus, and transmit a command signal, obtained by correcting the linearity of the received command signal, to a lower level apparatus through the vehicle communication network; a buffer unit configured to store the command signal, received through the command signal transmitting/receiving unit, as an original signal; and a control unit configured to generate a command signal whose linearity is corrected, by correcting the linearity of the original signal by using the original signal stored as the command signal in the buffer unit and a command signal obtained by delaying the command signal, stored in the buffer unit, by designated one unit time.

The upper level apparatus may transmit a command signal at an upper level through the vehicle communication network according to a designated command signal transfer system of the SBW system, and the lower level apparatus may receive a command signal at a lower level through the vehicle communication network according to the designated command signal transfer system of the SBW system.

The signal correction apparatus may further include a count signal transmitting/receiving unit configured to receive a count signal transmitted by the upper level apparatus and transmit the count signal to the lower level apparatus.

The count signal may be separately transmitted/received in synchronization with the command signal received through the vehicle communication network in order to check the period and linearity of the command signal, and constantly increased by a designated specific count value at each designated unit time in each period.

The control unit may determine whether the linearity of the command signal received through the vehicle communication network is maintained, by using the count value of the count signal.

In order to determine whether the linearity of the command signal is maintained, the control unit may determine whether a delay or peak occurs, by using the count value of the count signal in each period.

The control unit may check the count value of the count signal, received in synchronization with the command signal, in each period, and determine that the command signal was delayed, when the same count value as that in the previous period is retained even in the current period.

When the command signal is not delayed, the control unit may generate a command signal to be transmitted to a lower level apparatus, by using the command signal delayed by one unit time of the corresponding period.

When the command signal was delayed, the control unit may generate a command signal to be transmitted to a lower level apparatus, by using the original signal of the corresponding period.

The control unit may check the count value of the count signal, received in synchronization with the command signal, in each period, and determine that the command signal was delayed, when a count value which has doubled from that in the previous period is detected in the current period.

When no peak occurs in the command signal, the control unit may generate a command signal to be transmitted to a lower level apparatus, by using the command signal delayed by one unit time in the corresponding period.

When a peak occurred in the command signal, the control unit may generate a command signal to be transmitted to a lower level apparatus, by using only a half of the increase of the original signal in the corresponding period.

In an embodiment, a signal correction method of an SBW system may include: receiving, by a control unit of a signal correction apparatus of an SBW system, a command signal from an upper level apparatus; storing, by the control unit, the command signal as an original signal in a buffer unit; determining, by the control unit, whether the linearity of the command signal is maintained; and generating, by the control unit, a command signal whose linearity is corrected, by correcting the linearity of the original signal by using the original signal stored as the command signal in the buffer unit and a command signal obtained by delaying the command signal stored in the buffer unit by designated one unit time, when the linearity of the command signal is not maintained.

In the determining of whether the linearity of the command signal is maintained, the control unit may check the count value of a count signal, received in synchronization with the command signal, in each period, and determine that the command signal was delayed, when the same count value as that in the previous period is retained even in the current period.

In order to correct the linearity of the original signal, the control unit may generate a command signal to be transmitted to a lower level apparatus, by using the command signal delayed by one unit time in the corresponding period, when the command signal is not delayed.

In order to correct the linearity of the original signal, the control unit may generate a command signal to be transmitted to a lower level apparatus, by using the original signal of the corresponding period, when the command signal was delayed.

In the determining of whether the linearity of the command signal is maintained, the control unit may check the count value of the count signal, received in synchronization with the command signal, in each period, and determine that the command signal was delayed, when a count value which has doubled from that in the previous period is detected in the current period.

In order to correct the linearity of the original signal, the control unit may generate a command signal to be transmitted to a lower level apparatus, by using the command signal delayed by one unit time in the corresponding period, when no peak occurs in the command signal.

In order to correct the linearity of the original signal, the control unit may generate a command signal to be transmitted to a lower level apparatus, by using only a half of the increase of the original signal of the corresponding period, when a peak occurred in the command signal.

In accordance with the embodiment of the present disclosure, the signal correction apparatus and method of an SBW system may correct a signal received from the transmitting unit through the vehicle communication network by the receiving unit in a vehicle to which an SBW system is applied, such that the linearity of the signal is maintained.

DETAILED DESCRIPTION OF THE ILLUSTRATED EMBODIMENTS

Hereinafter, a signal correction apparatus and method of an SBW (Steer-By-Wire) system will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
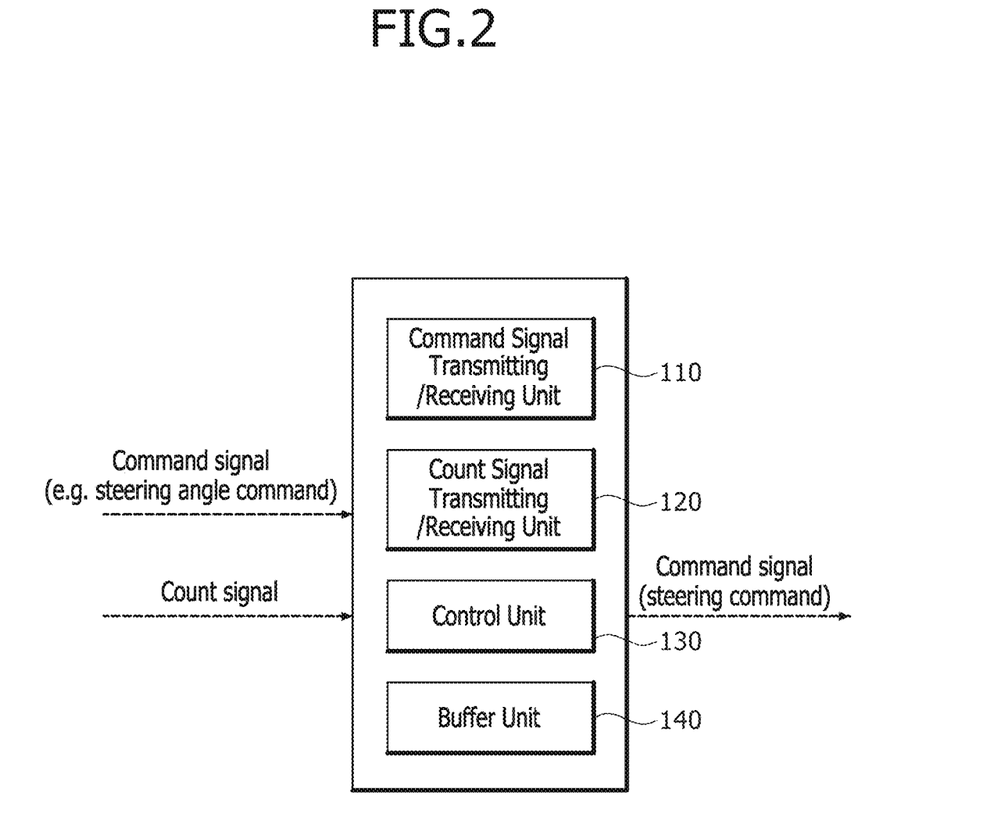
FIG. 2 is a diagram illustrating a schematic configuration of a signal correction apparatus of an SBW system in accordance with an embodiment of the present disclosure.

FIG. 2 is a diagram illustrating a schematic configuration of a signal correction apparatus of an SBW system in accordance with an embodiment of the present disclosure.

As illustrated in FIG. 2, a signal correction apparatus of an SBW (Steer-By-Wire) system in accordance with an embodiment of the present disclosure includes a command signal transceiver (command signal transmitting/receiving unit 110), a count signal transceiver (count signal transmitting/receiving unit 120), a control circuit embodied as one or more processors or other circuits configured to perform processing described herein (control unit 130) and a buffer or other memory (buffer unit 140).

The command signal transmitting/receiving unit 110 receives a command signal (e.g. steering angle command) transmitted by an upper level apparatus (not illustrated), e.g. an apparatus which transmits a command signal at an upper level through a vehicle communication network according to a designated command signal transfer system.

Furthermore, the command signal transmitting/receiving unit 110 transmits a command signal (e.g. steering command), obtained by correcting the linearity of the received command signal, to a lower level apparatus (not illustrated), e.g. an apparatus which receives the command signal at a lower level through the vehicle communication network according to the designated command signal transfer system.

Figure 3:
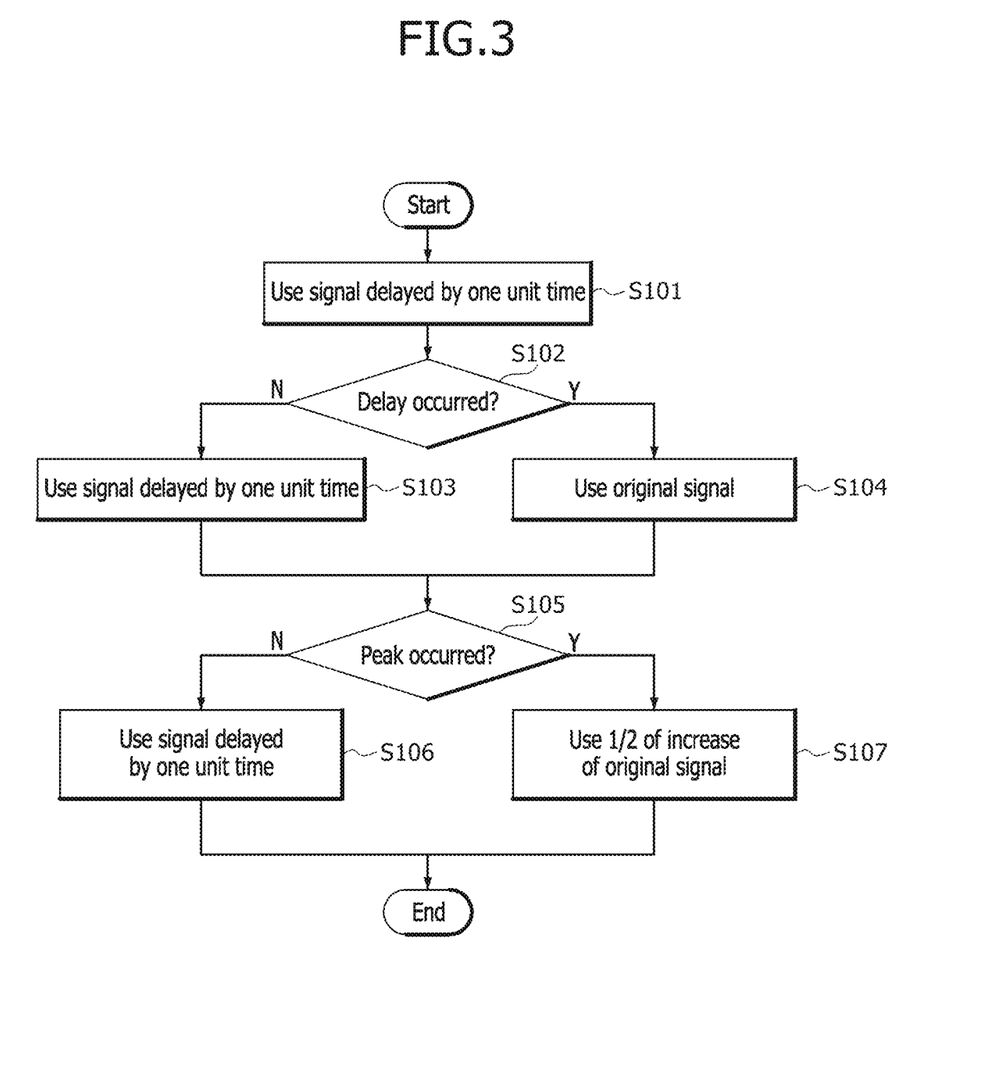
FIG. 3 is a flowchart for describing a signal correction method of an SBW system in accordance with an embodiment of the present disclosure.
Figure 4:
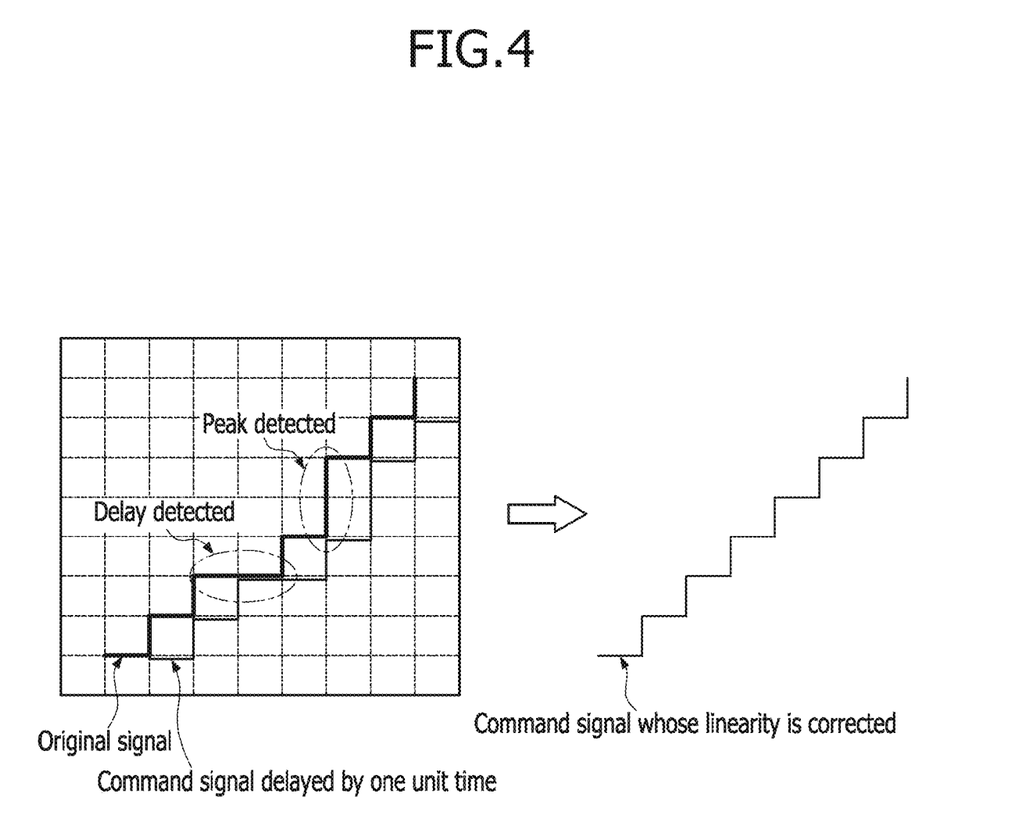
FIG. 4 is a graph for describing a method for correcting the linearity of a command signal in FIG. 3.

The control unit 130 corrects the linearity of the command signal received by the command signal transmitting/receiving unit 110 (see FIGS. 3 and 4).

At this time, in order to correct the linearity of the command signal (or the original signal), the control unit 130 stores the command signal (or the original signal), received by the command signal transmitting/receiving unit 110, in the buffer unit 140, and uses the command signal, delayed by a designated one unit time (e.g. 1 ms) from the original signal, and the original signal, i.e. the command signal which is stored in the buffer unit 140 and not yet delayed by one unit time.

The count signal transmitting/receiving unit 120 receives a count signal transmitted by the upper level apparatus (not illustrated), e.g. an apparatus which transmits a command signal at an upper level through the vehicle communication network according to the designated command signal transfer system, and transmits the count signal to the lower level apparatus.

The count signal refers to a signal which is separately transmitted/received in order to check the period and linearity of the command signal received through the vehicle communication network (e.g. CAN communication), and increased by a designated specific value of 1 in each period (i.e. designated one unit time).

The control unit 130 may determine whether the period and linearity of a current communication signal are maintained, by using the count value of the count signal.

For example, in order to determine whether the linearity of the command signal or the original signal is maintained, determine a section of the command signal or the original signal, in which the linearity thereof is not maintained, or determine whether a delay or peak occurred in the command signal or the original signal, the control unit 130 uses the count signal which is increased by 1 in each period (i.e. designated one unit time).

The control unit 130 determines the section in which the linearity is not maintained or a delay or peak occurred, on the basis of the count value of the count signal, and corrects the section of the command signal or the original signal, in which the linearity is not maintained or a delay or peak occurred, by using the command signal which is delayed by the designated one unit time (e.g. 1 ms) in each period (i.e. the designated one unit time), and the original signal, i.e. the command signal which is stored in the buffer unit 140 and not yet delayed by the one unit time (see FIGS. 3 and 4).

FIG. 3 is a flowchart for describing a signal control method of an SBW system in accordance with an embodiment of the present disclosure, and FIG. 4 is a diagram for describing a method for correcting the linearity of a command signal in FIG. 3.

Referring to FIG. 3, the control unit 130 stores the command signal, received from the upper level apparatus through the command signal transmitting/receiving unit 110, in the buffer unit 140, and generates a command signal to be transmitted to the lower level apparatus, i.e. a command signal which has been delayed by one unit time but whose linearity has been corrected, by using the command signal which is stored in the buffer unit 140 and delayed by one unit time (e.g. 1 ms), in step S101.

The control unit 130 checks the count value of a count signal, which is synchronized with the command signal or the original signal and separately received, in each period (i.e. designated one unit time), and determines that the command signal was delayed (Yes in step S102), when the same count value as that in the previous period is maintained in the current period, for example, when the count value of the previous period is 10 and the count value of the current period is 10.

Thus, when the command signal is not delayed (No in step S102), the control unit 130 generates a command signal which is to be transmitted to the lower level apparatus (i.e. a command signal which is delayed by one unit time but whose linearity has been corrected or the value of the command signal delayed by one unit time), by using the command signal delayed by one unit time (e.g. 1 ms) of the corresponding period, in step S103 (see FIG. 4).

On the other hand, when the command signal was delayed (Yes in step S102), the control unit 130 generates a command signal which is to be transmitted to the lower level apparatus, (i.e. a command signal which is delayed by one unit time but whose linearity has been corrected), by using the original signal of the corresponding period (i.e. the command signal which is stored in the buffer unit 140 and not yet delayed by one unit time or the value of the original signal), in step S103 (see FIG. 4).

The control unit 130 checks the count value of a count signal, which is synchronized with the command signal or the original signal and separately received, in each period (i.e. designated one unit time), and determines that a peak occurred in the command signal (Yes in step S105), when a count value increased by 2 from the count value in the previous period is detected in the current period, for example, when the count value of the previous period is 10 and the count value of the current period is 12.

Thus, when no peak occurs in the command signal (No in step S105), the control unit 130 generates a command signal which is to be transmitted to the lower level apparatus, (i.e. a command signal which is delayed by one unit time but whose linearity has been corrected), by using the command signal delayed by one unit time (e.g. 1 ms) from the corresponding period or the value of the command signal delayed by one unit time, in step S103 (see FIG. 4).

On the other hand, when a peak occurred in the command signal (Yes in step S105), the control unit 130 generates a command signal which is to be transmitted to the lower level apparatus, (i.e. a command signal which is delayed by one unit time but whose linearity has been corrected), by using only a half of the increase of the original signal of the corresponding period (i.e. the command signal which is stored in the buffer unit 140 and not yet delayed by one unit time), in step S107 (see FIG. 4). When only a half of the increase of the original signal is used, it may indicate that a value obtained by halving the increase is used, because the increase of the original signal is 2.

Steps S101 to S107 are continuously repeated while the command signal is transmitted/received between the upper level apparatus and the lower level apparatus through the vehicle communication network (e.g. CAN communication) during driving.

The vehicle communication network is not limited only to CAN communication, and the absolute time of the one unit time is different for each of a plurality of ECUs (Electronic Control Units) applied to the vehicle.

Referring to FIG. 4, a section of the original signal (i.e. the command signal which is stored in the buffer unit 140 and not yet delayed by one unit time), in which the linearity thereof is not maintained, i.e. a section where a delay or peak occurred, is corrected through the method described with reference to FIG. 3, and the command signal whose linearity is maintained is generated.

Figure 5:
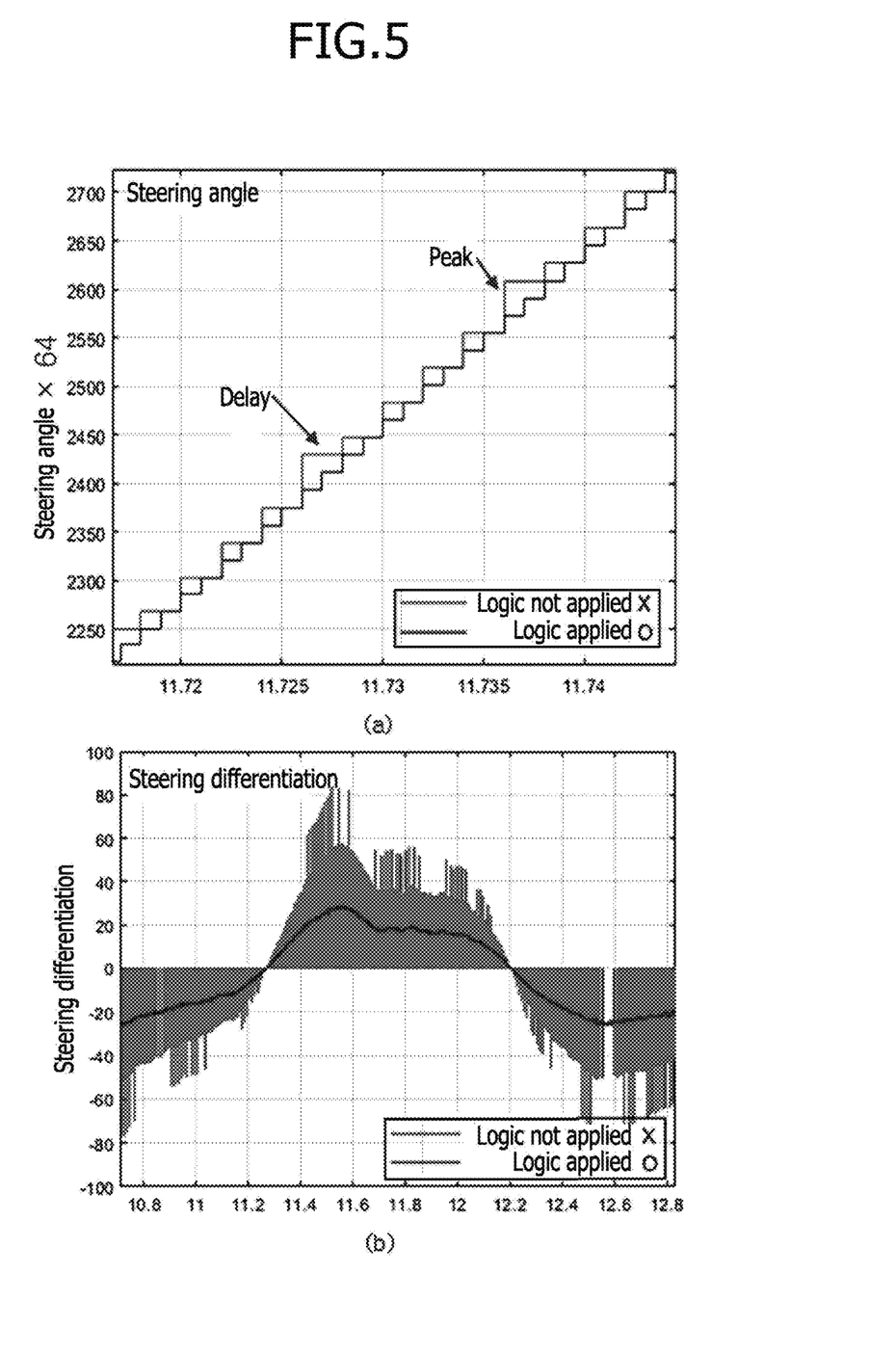
FIG. 5 is a graph showing a difference between a signal whose linearity is not corrected and a signal whose linearity is corrected by applying the signal correction method of an SBW system in accordance with the embodiment of the present disclosure.

FIG. 5 is a diagram showing a difference between a signal whose linearity is not corrected and a signal whose linearity is corrected by the signal correction method of the SBW system in accordance with the embodiment of the present disclosure.

FIG. 5A illustrates a steering angle signal received through the vehicle communication network, showing that the linearity of a signal corrected through the signal correction method (logic) in accordance with the present embodiment is maintained without a delay or peak.

FIG. 5B illustrates a signal waveform obtained by differentiating a steering angle signal received through the vehicle communication network, showing that, when a signal corrected through the signal correction method (logic) in accordance with the present embodiment is differentiated, the linearity of the signal is smoothly maintained without disturbance.

In a vehicle to which an SBW system is applied, the signal correction apparatus and method of an SBW system in accordance with the embodiment of the present disclosure may correct a signal received from the transmitting unit through the vehicle communication network by the receiving unit, such that the linearity of the signal is maintained. Thus, the signal correction apparatus and method may correct a section of the steering angle signal, in which the linearity thereof is not maintained, i.e. a section where a delay or peak occurred, thereby smoothly and stably controlling steering.

Although the present disclosure has been disclosed with reference to the embodiments illustrated in the drawings, the embodiments are only for illustrative purposes, and those skilled in the art will appreciate that various modifications and other equivalent embodiments are possible from the embodiments. Thus, the technical scope of the present disclosure should be defined by the following claims. Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A signal correction apparatus of an SBW (Steer-By-Wire) system, comprising:
   a command signal transceiver configured to receive a command signal transmitted through a vehicle communication network by an upper level apparatus, and transmit a command signal, obtained by correcting the linearity of the received command signal, to a lower level apparatus through the vehicle communication network;
   a buffer configured to store the command signal, received through the command signal transceiver, as an original signal; and
   a control circuit configured to generate a corrected command signal whose linearity is corrected by correcting a linearity of the original signal using the original signal and a delayed command signal obtained by delaying the original signal by a designated one unit time.

2. The signal correction apparatus of claim 1, wherein the upper level apparatus transmits a command signal at an upper level through the vehicle communication network according to a designated command signal transfer system of the SBW system, and
   the lower level apparatus receives a command signal at a lower level through the vehicle communication network according to the designated command signal transfer system of the SBW system.

3. The signal correction apparatus of claim 1, further comprising a count signal transceiver configured to receive a count signal transmitted by the upper level apparatus and transmit the count signal to the lower level apparatus.

4. The signal correction apparatus of claim 3, wherein the count signal is separately transmitted/received in synchronization with the command signal received through the vehicle communication network in order to check a period and linearity of the command signal, and constantly increased by a designated specific count value at each designated unit time in each period.

5. The signal correction apparatus of claim 1, wherein the control circuit is configured to determine whether the linearity of the command signal received through the vehicle communication network is maintained by using a count value of a count signal.

6. The signal correction apparatus of claim 5, wherein in order to determine whether the linearity of the command signal is maintained, the control circuit is configured to determine whether a delay or peak occurs by using a count value of a count signal in each period of a plurality of periods.

7. The signal correction apparatus of claim 1, wherein the control circuit is configured to check a count value of a count signal, received in synchronization with the command signal, in each period of a plurality of periods, and configured to determine that the command signal was delayed when the same count value as that in a previous period is retained in a current period.

8. The signal correction apparatus of claim 7, wherein in response to determining the command signal is not delayed, the control circuit is configured to generate a command signal to be transmitted to a lower level apparatus by using the command signal delayed by one unit time of the corresponding period.

9. The signal correction apparatus of claim 7, wherein in response to determining the command signal was delayed, the control circuit is configured to generate a command signal to be transmitted to a lower level apparatus by using the original signal of the corresponding period.

10. The signal correction apparatus of claim 1, wherein the control circuit is configured to check a count value of a count signal, received in synchronization with the command signal, in each period of a plurality of periods, and configured to determine that the command signal was delayed when a count value which has doubled from that in a previous period is detected in a current period.

11. The signal correction apparatus of claim 10, wherein in response to determining no peak occurs in the command signal, the control circuit is configured to generate a command signal to be transmitted to a lower level apparatus by using the command signal delayed by one unit time in a corresponding period.

12. The signal correction apparatus of claim 10, wherein in response to determining a peak occurred in the command signal, the control circuit is configured to generate a command signal to be transmitted to a lower level apparatus by using a half of an increase of the original signal in a corresponding period.

13. A signal correction method of an SBW system, comprising:
   receiving, by a control circuit of a signal correction apparatus of an SBW system, a command signal from an upper level apparatus;
   storing, by the control circuit, the command signal as an original signal in a buffer;
   determining, by the control circuit, whether the linearity of the command signal is maintained; and
   generating, by the control circuit, a corrected command signal whose linearity is corrected by correcting a linearity of the original signal using the original signal and a delayed command signal obtained by delaying the original signal by a designated one unit time in response to determining the linearity of the command signal is not maintained.

14. The signal correction method of claim 13, wherein in the determining of whether the linearity of the command signal is maintained, the control circuit checks a count value of a count signal, received in synchronization with the command signal, in each period of a plurality of periods, and determines that the command signal was delayed when the same count value as that in a previous period is retained in a current period.

15. The signal correction method of claim 13, wherein in order to correct the linearity of the original signal, the control circuit generates a command signal to be transmitted to a lower level apparatus by using the command signal delayed by one unit time in a corresponding period in response to determining the command signal is not delayed.

16. The signal correction method of claim 13, wherein in order to correct the linearity of the original signal, the control circuit generates a command signal to be transmitted to a lower level apparatus by using the original signal of a corresponding period, in response to determining the command signal was delayed.

17. The signal correction method of claim 13, wherein in the determining of whether the linearity of the command signal is maintained, the control circuit checks a count value of a count signal, received in synchronization with the command signal, in each period of a plurality of periods, and determines that the command signal was delayed in response to determining a count value which has doubled from that in a previous period is detected in a current period.

18. The signal correction method of claim 13, wherein in order to correct the linearity of the original signal, the control circuit generates a command signal to be transmitted to a lower level apparatus by using the command signal delayed by one unit time in a corresponding period in response to determining no peak occurs in the command signal.

19. The signal correction method of claim 13, wherein in order to correct the linearity of the original signal, the control circuit generates a command signal to be transmitted to a lower level apparatus by using a half of an increase of the original signal of a corresponding period in response to determining a peak occurred in the command signal.

* * * * *